(12) United States Patent
Wada et al.

(10) Patent No.: US 11,673,447 B2
(45) Date of Patent: Jun. 13, 2023

(54) CAB FOR WORK VEHICLE AND WORK VEHICLE

(71) Applicant: KOMATSU LTD., Tokyo (JP)

(72) Inventors: Hirofumi Wada, Tokyo (JP); Masato Kitashou, Tokyo (JP); Yuuki Shimasaki, Tokyo (JP); Kazunari Shinagawa, Tokyo (JP); Takushi Izawa, Tokyo (JP); Kenichi Muramoto, Tokyo (JP); Junichirou Imai, Tokyo (JP); Izumi Nakade, Tokyo (JP); Hidenori Tatsuta, Tokyo (JP); Masahiko Hamaguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 511 days.

(21) Appl. No.: 16/479,650

(22) PCT Filed: Jun. 4, 2018

(86) PCT No.: PCT/JP2018/021332
§ 371 (c)(1),
(2) Date: Jul. 22, 2019

(87) PCT Pub. No.: WO2019/003808
PCT Pub. Date: Jan. 3, 2019

(65) Prior Publication Data
US 2021/0354766 A1 Nov. 18, 2021

(30) Foreign Application Priority Data
Jun. 26, 2017 (JP) .............................. JP2017-123915

(51) Int. Cl.
*B60H 1/00* (2006.01)
*B60H 1/26* (2006.01)
(Continued)

(52) U.S. Cl.
CPC ......... *B60H 1/00378* (2013.01); *B60H 1/267* (2013.01); *B60J 1/02* (2013.01);
(Continued)

(58) Field of Classification Search
CPC ...... B60H 1/00378; B60H 1/26; B60H 1/267; B62D 33/06; B62D 33/0617; E02F 3/283; E02F 9/0858; E02F 9/16; E02F 9/2004
(Continued)

(56) References Cited

U.S. PATENT DOCUMENTS 5,273,340 A * 12/1993 Nelson ................... B62D 33/06
296/190.08
5,413,188 A 5/1995 Ui
(Continued)

FOREIGN PATENT DOCUMENTS

EP 01535772 A2 6/2005
EP 02180100 A1 4/2010
(Continued)

OTHER PUBLICATIONS

English translation of JP H04-314618; retrieved via PatentTranslate located at www.epo.org. (Year: 2022).*

*Primary Examiner* — Jason S Daniels
(74) *Attorney, Agent, or Firm* — Faegre Drinker Biddle & Reath LLP

(57) ABSTRACT

An operator seat is arranged in a cab. An air-conditioning unit is arranged in front of the operator seat. A lower window through which the outside can be seen from the inside of the cab is arranged in front of the operator seat and laterally to the air-conditioning unit.

11 Claims, 4 Drawing Sheets

(51) Int. Cl.
  *B60J 1/02* (2006.01)
  *B60N 2/005* (2006.01)
  *B62D 25/04* (2006.01)
  *B62D 25/20* (2006.01)
  *B62D 33/06* (2006.01)
  *E02F 9/16* (2006.01)
  *B66C 13/54* (2006.01)
  *E02F 3/28* (2006.01)
  *E02F 9/20* (2006.01)

(52) U.S. Cl.
  CPC ............. *B60N 2/005* (2013.01); *B62D 25/04* (2013.01); *B62D 25/20* (2013.01); *B62D 33/0617* (2013.01); *E02F 9/16* (2013.01); *B66C 13/54* (2013.01); *E02F 3/283* (2013.01); *E02F 9/2004* (2013.01)

(58) Field of Classification Search
  USPC ........................................ 296/190.08, 190.09
  See application file for complete search history.

(56) References Cited

U.S. PATENT DOCUMENTS

| | | | |
|---|---|---|---|
| 8,740,288 B2 * | 6/2014 | Kamimae | B62D 33/0617 296/190.09 |
| 2010/0102594 A1 | 4/2010 | Kimura et al. | |
| 2015/0000996 A1 * | 1/2015 | Nagami | E02F 9/163 296/190.08 |
| 2015/0218778 A1 * | 8/2015 | Kimura | B60H 1/00378 296/190.09 |
| 2016/0114837 A1 * | 4/2016 | Iwahashi | B62D 33/0617 296/190.08 |
| 2017/0225725 A1 * | 8/2017 | Hansen | E02F 9/2004 |
| 2018/0058037 A1 * | 3/2018 | Muramoto | E02F 9/16 |

FOREIGN PATENT DOCUMENTS

| | | | | |
|---|---|---|---|---|
| EP | 02664716 A1 | 11/2013 | | |
| JP | S59-080572 U | 5/1984 | | |
| JP | H04-314618 A | 11/1992 | | |
| JP | H05-106240 A | 4/1993 | | |
| JP | 3189287 B2 | 7/2001 | | |
| JP | 3557862 B2 | 8/2004 | | |
| JP | 2004-322980 A | 11/2004 | | |
| JP | 2006-342583 A | 12/2006 | | |
| JP | 2007-001433 A | 1/2007 | | |
| JP | 2007-154444 A | 6/2007 | | |
| JP | 2008-106522 A | 5/2008 | | |
| JP | 2011-1775 A | 1/2011 | | |
| JP | 4681502 B2 | 5/2011 | | |
| JP | 4945122 B2 | 6/2012 | | |
| KR | 20050022331 A | * | 3/2005 | ............... E02F 9/26 |
| KR | 10-2012-0140122 A | 12/2012 | | |
| WO | WO 2007/063668 A1 | 6/2007 | | |
| WO | WO-2009/022510 A1 | 2/2009 | | |

* cited by examiner

CAB FOR WORK VEHICLE AND WORK VEHICLE

TECHNICAL FIELD

The present invention relates to a cab for a work vehicle and a work vehicle, and particularly to a cab for a work vehicle and a work vehicle which include an air-conditioning unit.

BACKGROUND ART

A work vehicle including an air-conditioning unit is disclosed, for example, in Japanese Patent Laying-Open No. 2007-154444 (PTL 1). In PTL 1, the air-conditioning unit is arranged under a front console box in a cab. A space can thus be created in the rear of an operator seat so that the operator seat can be slid to a greater extent in a fore/aft direction.

CITATION LIST

Patent Literature

PTL 1: Japanese Patent Laying-Open No. 2007-154444

SUMMARY OF INVENTION

Technical Problem

Improvement in operator's visibility of the outside from the inside of a cab in a work vehicle including such an air-conditioning unit has been demanded.

An object of the present disclosure is to provide a cab for a work vehicle and a work vehicle which achieve improvement in visibility of the outside from the inside of the cab in the presence of an air-conditioning unit.

Solution to Problem

A cab for a work vehicle in the present disclosure includes an operator seat, an air-conditioning unit, and a front wall. The air-conditioning unit is arranged in front of the operator seat. The front wall is arranged in front of the operator seat and laterally to the air-conditioning unit and includes a first window portion through which the outside can be seen from the inside of the cab for the work vehicle.

A work vehicle according to the present disclosure includes the cab for the work vehicle described above and a work implement operated by an operation apparatus provided in the cab for the work vehicle.

Advantageous Effects of Invention

According to the present disclosure, a cab for a work vehicle and a work vehicle which achieve improvement in visibility of the outside from the inside of the cab in the presence of an air-conditioning unit can be obtained.

DESCRIPTION OF EMBODIMENTS

An embodiment of the present disclosure will be described below with reference to the drawings.

Initially, a construction of a work vehicle in one embodiment of the present disclosure will be described. A wheel loader representing one example of a work vehicle to which the concept of the present disclosure can be applied will be described below with reference to FIG. 1. The present disclosure is applicable also to a work vehicle such as a hydraulic excavator, a crawler dozer, and a crane other than the wheel loader.

In the present example, positional relation of portions will be described with an operator who is seated at an operator seat 14 in a cab 10 being defined as the reference. A fore/aft direction refers to front and rear directions of the operator who is seated at the operator seat. A lateral direction (a width direction) refers to left and right directions of the operator who is seated at the operator seat. A vertical direction refers to upward and downward directions of the operator who is seated at the operator seat.

A direction which the operator seated at the operator seat faces is the fore direction, and a direction opposite to the fore direction is the aft direction. The right side and the left side at the time when the operator seated at the operator seat faces the front is right and left directions, respectively. A foot side of the operator who is seated at the operator seat refers to a lower side and a head side refers to an upper side.

Figure 1:
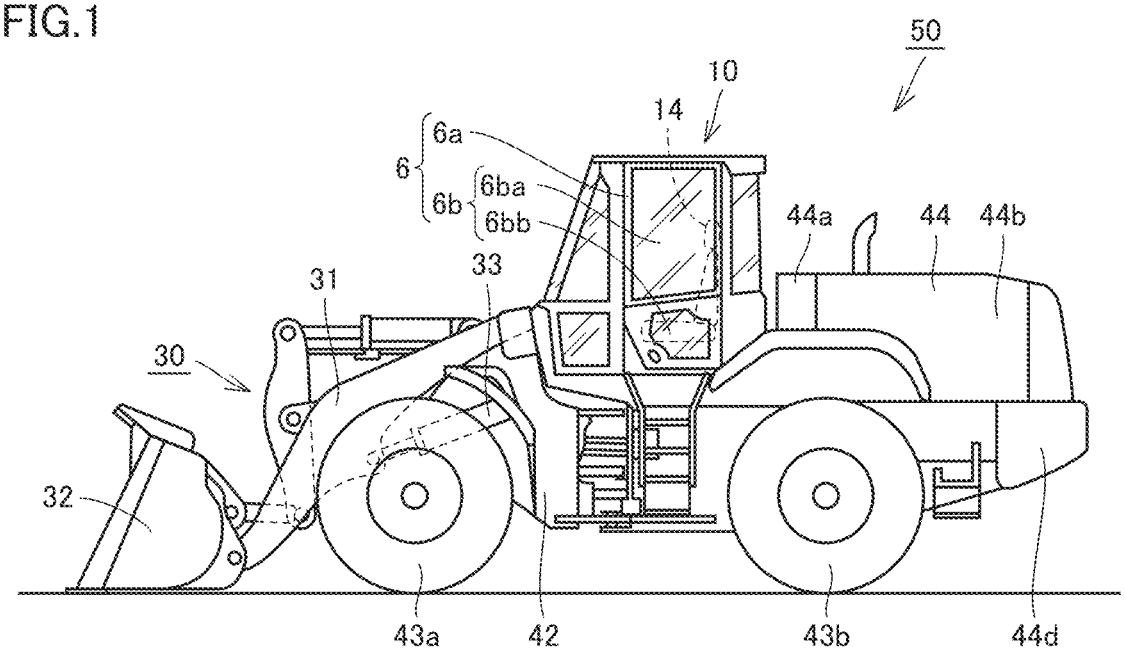
FIG. 1 is a schematic side view showing a construction of a wheel loader representing an example of a work vehicle in one embodiment.

FIG. 1 is a schematic side view showing a construction of a wheel loader representing an example of a work vehicle in one embodiment. As shown in FIG. 1, a wheel loader 50 in the present embodiment mainly has a front frame 42, a rear vehicular body 44, and a work implement 30. A front wheel 43a is attached to each of opposing side portions of front frame 42. A rear wheel 43b is attached to each of opposing side portions of rear vehicular body 44.

Front frame 42 and rear vehicular body 44 are attached to each other to freely laterally be actuated by means of a center pin (not shown). Front frame 42 and rear vehicular body 44 implement an articulated structure.

Specifically, front frame 42 and rear vehicular body 44 are coupled to each other by a pair of left and right steering cylinders (not shown). As these left and right steering cylinders extend and contract, front frame 42 and rear vehicular body 44 are laterally actuated and steered around the center pin. Front frame 42 and rear vehicular body 44 implement a vehicular body of wheel loader 50.

Work implement 30 is attached in front of front frame 42. Work implement 30 has a pair of booms 31, a bucket 32, and a pair of boom cylinders 33.

An engine compartment 44b is arranged in rear vehicular body 44.

Rear vehicular body 44 has a cab (an operator's cab) 10 in front of engine compartment 44b. Cab 10 defines a space for an operator to operate wheel loader 50 inside.

A construction of cab 10 will now be described with reference to FIGS. 2 to 7.

Figure 2:
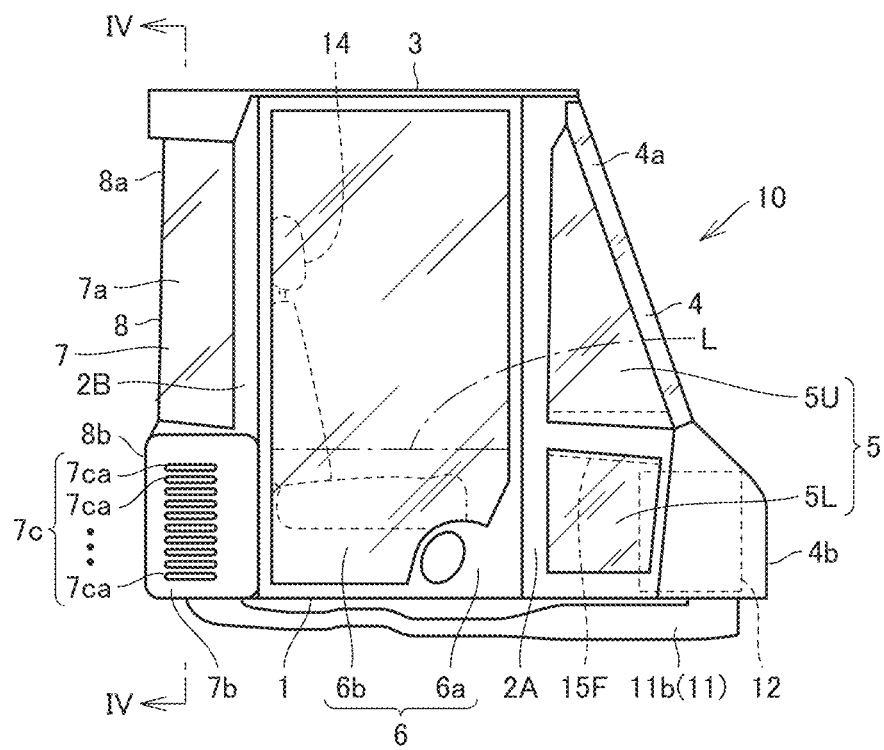
FIG. 2 is a side view showing a construction of a cab in the wheel loader shown in FIG. 1.
Figure 3:
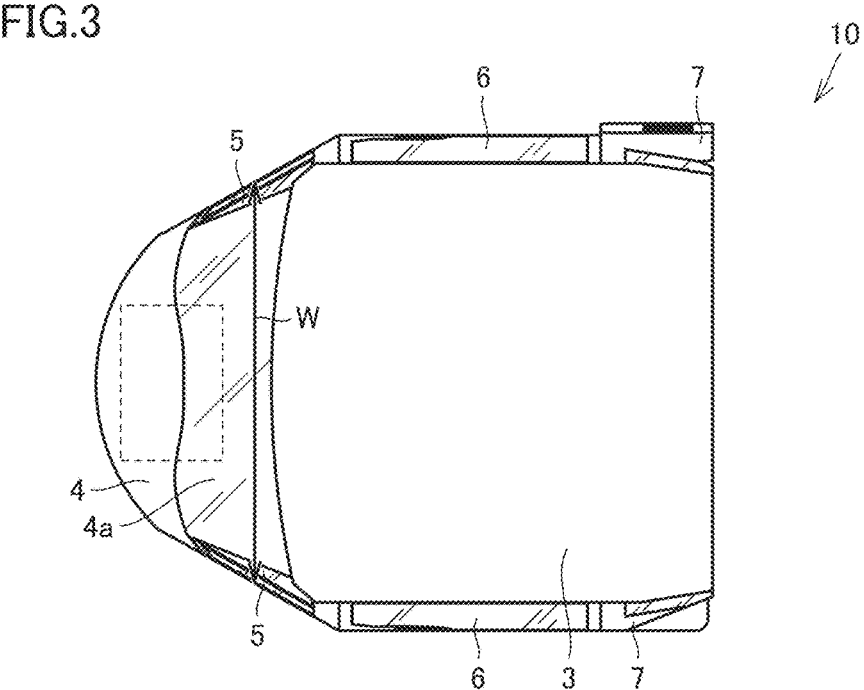
FIG. 3 is a plan view showing the construction of the cab in the wheel loader shown in FIG. 1.
Figure 4:
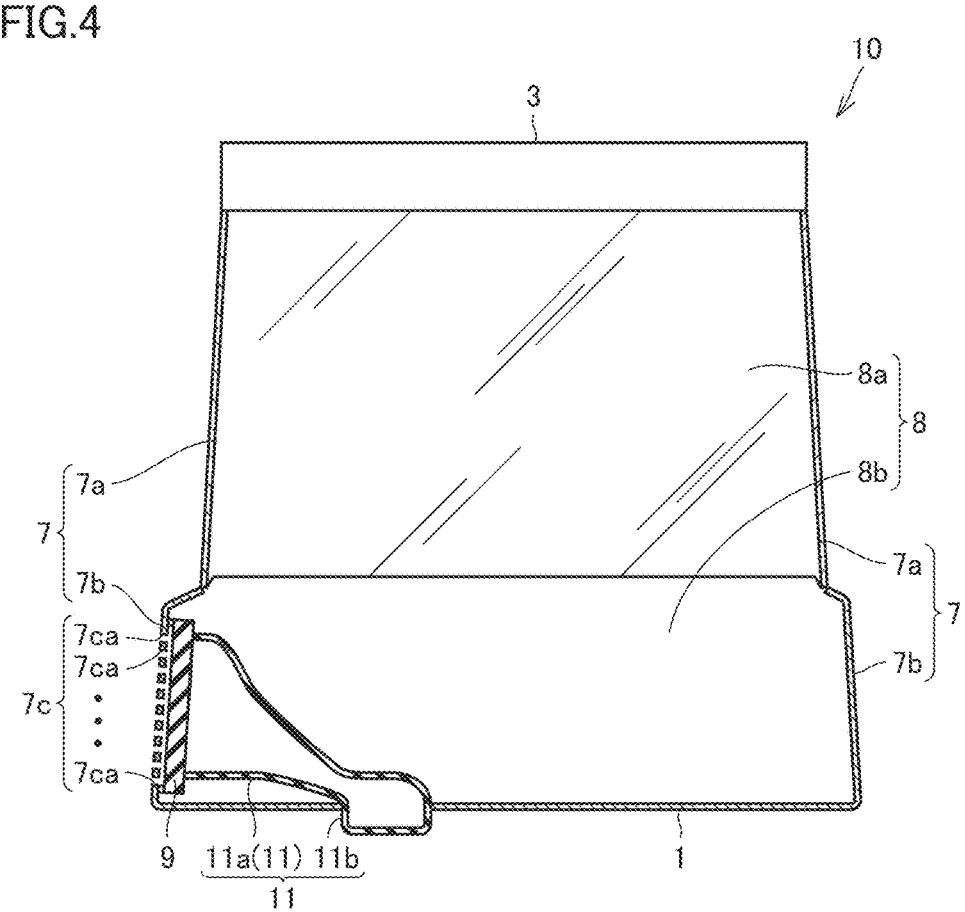
FIG. 4 is a schematic cross-sectional view along the line IV-IV in FIG. 2.
Figure 5:
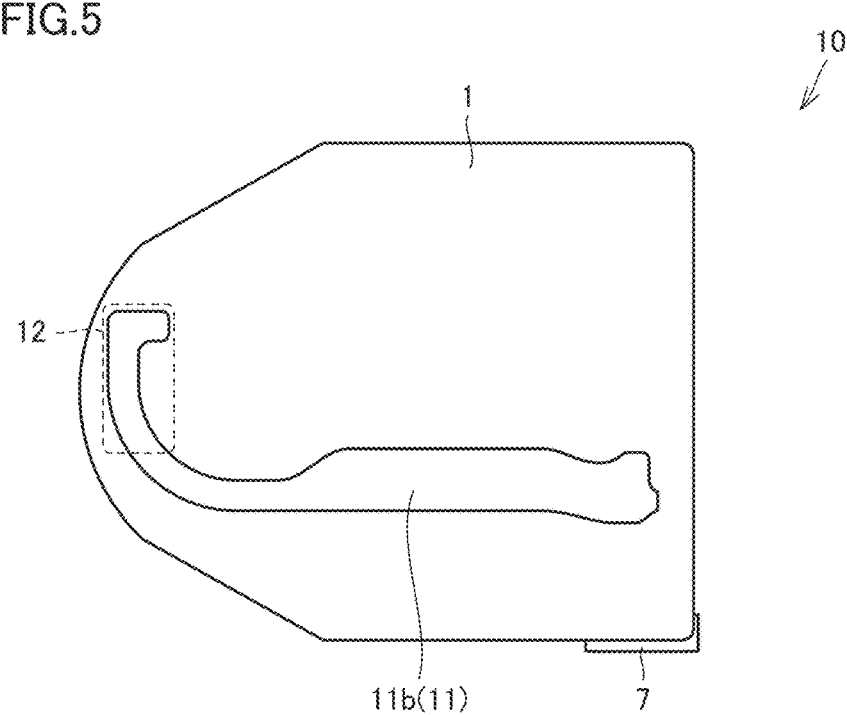
FIG. 5 is a bottom view showing the construction of the cab in the wheel loader shown in FIG. 1.
Figure 6:
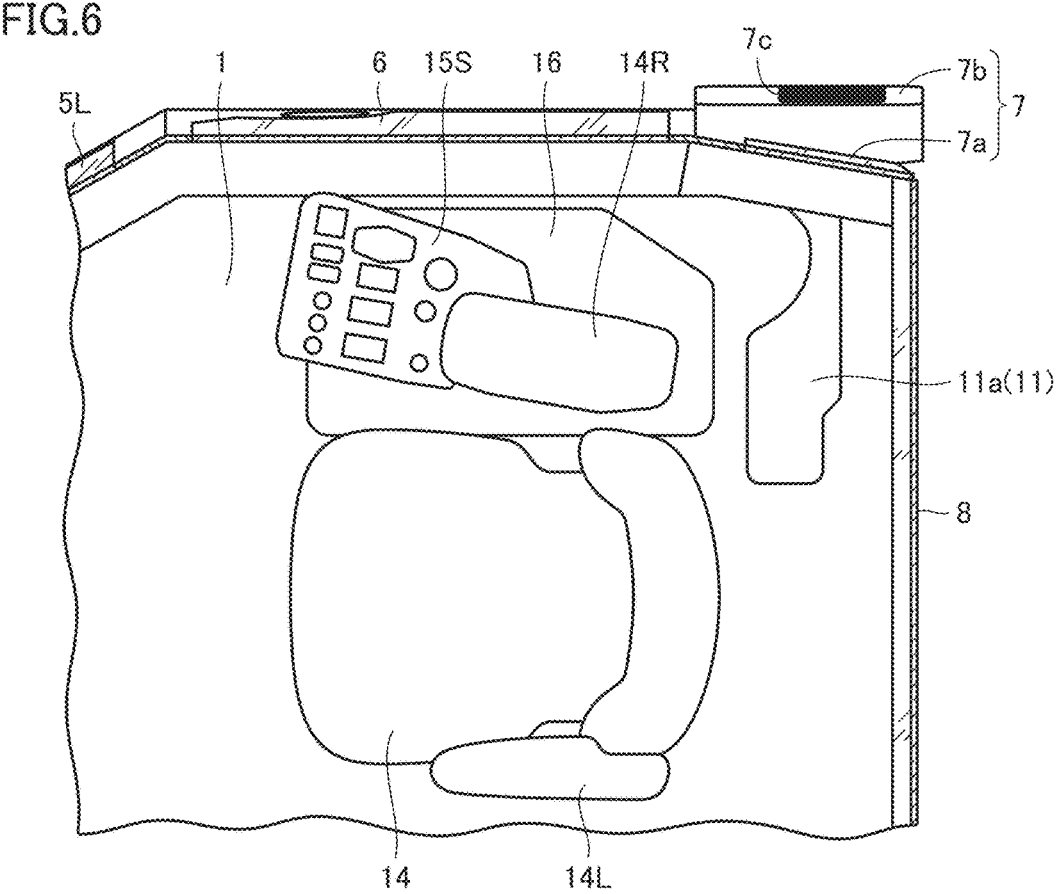
FIG. 6 is a plan view showing a construction of the inside of the cab in the wheel loader shown in FIG. 1.
Figure 7:
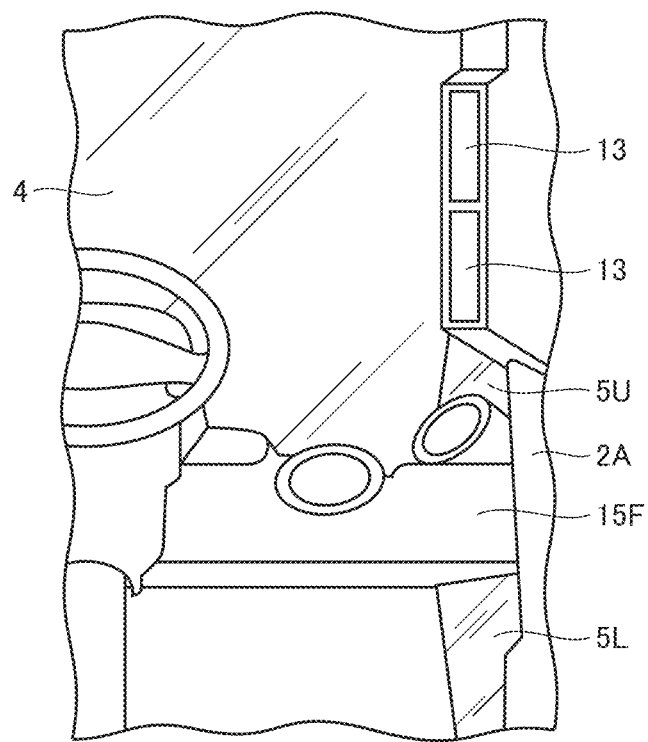
FIG. 7 is a diagram showing a construction of the inside of the cab in the wheel loader shown in FIG. 1.

FIGS. 2 and 3 are a side view and a plan view showing a construction of the cab in the wheel loader shown in FIG. 1, respectively. FIG. 4 is a schematic cross-sectional view along the line IV-IV in FIG. 2. FIG. 5 is a bottom view showing the construction of the cab in the wheel loader shown in FIG. 1. Each of FIGS. 6 and 7 is a diagram showing a construction of the inside of the cab in the wheel loader shown in FIG. 1.

As shown in FIG. 2, cab 10 in the present embodiment mainly includes a floor panel 1, a plurality of pillars 2A and 2B, a roof portion 3, a front portion 4, a pair of left and right front sidewalls 5, a pair of left and right central sidewalls 6, a pair of left and right rear sidewalls 7, a rear portion 8, an air-conditioning unit 12, operator seat 14, and a front console 15F.

The plurality of pillars 2A, 2B include a pair of left and right front pillars 2A and a pair of left and right rear pillars 2B. The pair of left and right front pillars 2A and the pair of left and right rear pillars 2B are erected on floor panel 1. The pair of left and right front pillars 2A and the pair of left and right rear pillars 2B are each arranged such that a longitudinal direction thereof vertically extends. Front pillars 2A and rear pillars 2B are arranged in this order in cab 10 as being aligned from the front toward the rear.

Roof portion 3 is arranged in an upper portion of cab 10 and supported by the plurality of pillars 2A and 2B with respect to floor panel 1. A beam member (not shown) is connected to each of an upper end portion of front pillar 2A and an upper end portion of rear pillar 2B and connected to roof portion 3.

Front portion 4 is arranged in a front part of cab 10. Front portion 4 includes a front window 4a and an exterior panel 4b. Front window 4a is arranged above exterior panel 4b. Rear portion 8 is arranged in a rear part of cab 10. Rear portion 8 includes a rear window 8a and an exterior panel 8b. Rear window 8a is arranged above exterior panel 8b.

Central sidewall 6 is arranged between front pillar 2A and rear pillar 2B. Central sidewall 6 may be provided as a door for boarding. When central sidewall 6 is provided as the door for boarding, door for boarding 6 is supported, for example, by rear pillar 2B for opening and closing. Door for boarding 6 serves as a port of entry and exit for an operator who operates wheel loader 50. Central sidewall 6 may be fixed (permanently set) as being fitted between front pillar 2A and rear pillar 2B.

Front sidewall 5 extends forward from front pillar 2A. Front sidewall 5 is arranged between front pillar 2A and front portion 4. Rear sidewall 7 extends rearward from rear pillar 2B. Rear sidewall 7 is arranged between rear pillar 2B and rear portion 8. Front portion 4 and front sidewall 5 define a front wall.

Air-conditioning unit 12, operator seat 14, and front console 15F are each arranged in cab 10. Front console 15F is arranged in front of operator seat 14. Front console 15F includes a front operation panel (front operation portion). The front operation panel includes, for example, a parking brake switch, an electronic controlled suspension system (ECSS) switch, a working light switch, and a wiper switch.

Air-conditioning unit 12 is arranged in front of operator seat 14 below front console 15F. Air-conditioning unit 12 includes an indoor and outdoor air switch door, a fan, an evaporator, a heater core, and the like. The fan takes in indoor air and outdoor air into the air-conditioning unit, sends air to the evaporator and the heater core, and thereafter sends air into an internal space in the operator's cab. Air in the internal space in cab 10 is thus conditioned.

Front window 4a in front portion 4 is arranged above an upper surface of front console 15F. Rear window 8a in rear portion 8 is arranged in an upper part of rear portion 8. Each of front window 4a and rear window 8a is made from a transparent member (for example, glass) through which the outside can be seen from the inside of cab 10. The operator who is seated at operator seat 14 can thus have a view in front of wheel loader 50 through front window 4a and a view in the rear of wheel loader 50 through rear window 8a.

Each of the pair of left and right central sidewalls 6 is constructed such that the outside can be seen therethrough from the inside of cab 10. Specifically, each of the pair of left and right central sidewalls 6 includes, for example, a frame 6a and a transparent member 6b. Transparent member 6b is fitted into frame 6a. Transparent member 6b is constructed such that the outside can be seen therethrough from the inside of cab 10, and made, for example, of glass.

Transparent member 6b may be arranged substantially across central sidewall 6 from an upper end to a lower end thereof in a direction of height. In this case, a part of central sidewall 6 located under a lower end position (a chain dotted line L in the figure) of front console 15F includes transparent member 6b as a window portion (a second window portion) through which the outside can be seen from the inside of cab 10.

As shown in FIG. 1, transparent member 6b of central sidewall 6 may be divided into an upper portion 6ba and a lower portion 6bb by frame 6a. In this case, lower portion 6bb of transparent member 6b is located under the lower end position (chain dotted line L in the figure: FIG. 2) of front console 15F. In this case, lower portion 6bb located under the lower end position (chain dotted line L in the figure) of front console 15F is provided as the window portion (second window portion) through which the outside can be seen from the inside of cab 10. The operator who is seated at operator seat 14 can thus have a view laterally below and laterally above wheel loader 50 through transparent member 6b of central sidewall 6.

The lower end position (chain dotted line L in the figure) of front console 15F means a lowest position of a lower surface of front console 15F located above an accelerator pedal or a brake pedal.

As shown in FIG. 2, each of the pair of left and right front sidewalls 5 includes an upper window 5U and a lower window 5L (a first window portion). Upper window 5U is located above the upper surface of front console 15F. Lower window 5L is located below the lower end position (chain dotted line L in the figure: FIG. 2) of front console 15F. Lower window 5L is arranged in front of operator seat 14 and laterally to air-conditioning unit 12. Laterally to air-conditioning unit 12 means a lateral side up to a height position as high as a height position of air-conditioning unit 12 with at least floor panel 1 being defined as the reference.

Each of upper window 5U and lower window 5L is made from a transparent member (for example, glass) through which the outside can be seen from the inside of cab 10. The operator who is seated at operator seat 14 can thus have a view obliquely forward above wheel loader 50 through upper window 5U and a view obliquely forward below wheel loader 50 through lower window 5L.

Both of the pair of left and right front sidewalls 5 include lower window 5L. Upper window 5U and lower window 5L may form a single window (a single seamless window) without being separated from each other. In each of upper window 5U and lower window 5L, a transparent member such as glass may be fitted, or may not be fitted so that the inside and the outside of cab 10 communicate with each other through upper window 5U and lower window 5L.

Each of the pair of left and right rear sidewalls 7 includes a window 7a and an exterior panel 7b. Window 7a is arranged above exterior panel 7b. Window 7a is made, for example, from a transparent member (for example, glass) through which the outside can be seen from the inside of cab 10. The operator who is seated at operator seat 14 can thus have a view obliquely behind wheel loader 50 through window 7a.

Rear sidewall 7 includes an outdoor air suction inlet 7c. Specifically, exterior panel 7b in one of the pair of left and right rear sidewalls 7 includes outdoor air suction inlet 7c. Outdoor air suction inlet 7c serves to supply air (outdoor air) to air-conditioning unit 12. Outdoor air suction inlet 7c is defined, for example, by a plurality of slits 7ca. Each of the plurality of slits 7ca passes through exterior panel 7b. Outdoor air suction inlet 7c includes a part located under the lower end position (chain dotted line L in the figure: FIG. 2) of front console 15F.

Exterior panel 7b of rear sidewall 7 may be integrated with exterior panel 8b of rear portion 8. Exterior panel 7b of rear sidewall 7 may serve as a cover which can be opened and closed with respect to exterior panel 8b of rear portion 8. In this case, a filter 9 is preferably replaceable from the outside of wheel loader 50 by opening exterior panel 7b. An operation for replacing filter 9 is thus facilitated.

As shown in FIG. 3, in a plan view, a distance W between the pair of left and right front sidewalls 5 decreases from the rear toward the front. The plan view means a point of view of roof portion 3 or floor panel 1 in a direction orthogonal to an upper surface of roof portion 3 or an upper surface of floor panel 1. Each of the pair of left and right front sidewalls 5 is inclined with respect to central sidewall 6 in the plan view.

As shown in FIG. 4, filter 9 is arranged on an inner side of outdoor air suction inlet 7c in exterior panel 7b. Filter 9 is made, for example, from a nonwoven fabric sheet. Filter 9 serves to clean air by removing dust or the like from air suctioned through outdoor air suction inlet 7c. Filter 9 is arranged along exterior panel 7b. Filter 9 is arranged between outdoor air suction inlet 7c and a duct 11.

Duct 11 serves to guide outdoor air through outdoor air suction inlet 7c to air-conditioning unit 12. Duct 11 includes an indoor duct 11a and an outdoor duct 11b. Indoor duct 11a is arranged in cab 10. Indoor duct 11a has one opening end covered with filter 9. Indoor duct 11a has the other opening end supported by floor panel 1.

A through hole is provided in a portion of floor panel 1 which supports the other opening end of indoor duct 11a. At least a part of duct 11 (outdoor duct 11b) is arranged outside cab 10 under floor panel 1. Outdoor duct 11b has one opening end supported by floor panel 1. An internal flow path in outdoor duct 11b and an internal flow path in indoor duct 11a communicate with each other through the through hole provided in floor panel 1.

As shown in FIG. 5, outdoor duct 11b is supported on a lower surface of floor panel 1. Outdoor duct 11b extends from a rear position toward a front position in cab 10 and reaches a position directly under air-conditioning unit 12. The internal flow path in outdoor duct 11b communicates with an outdoor air introduction path of air-conditioning unit 12 through a through hole in floor panel 1. Outdoor air taken in through outdoor air suction inlet 7c is thus purified by filter 9 and thereafter supplied to air-conditioning unit 12 through duct 11.

As shown in FIG. 6, cab 10 further includes a pair of left and right armrests 14R and 14L, a lateral console 15S, and a controller 16. Armrest 14R is arranged, for example, on the right side of operator seat 14. Armrest 14L is arranged, for example, on the left side of operator seat 14.

Lateral console 15S is arranged, for example, on the right side of operator seat 14. Lateral console 15S includes, for example, a work implement lever (an operation apparatus) for operating the work implement. Lateral console 15S includes, for example, a kick down switch, a transmission cut-off switch, a horn switch, a forward and rearward travel switch, and a remote positioner switch.

Controller 16 is arranged directly under lateral console 15S. Controller 16 serves to control an operation by each component of wheel loader 50. Controller 16 includes, for example, a central processing unit and a storage.

Controller 16 is transversely mounted on the upper surface of floor panel 1. Specifically, controller 16 is supported on the upper surface of floor panel 1 in such a manner that a lateral dimension thereof in a plane orthogonal to the height direction is longer than a thickness thereof in the direction of height from the upper surface of floor panel 1.

Lower window 5L and outdoor air suction inlet 7c are located on a lateral side the same as a lateral side where lateral console 15S is arranged with respect to operator seat 14. Specifically, when lateral console 15S is arranged, for example, on the right side of operator seat 14, both of lower window 5L and outdoor air suction inlet 7c are also arranged on the right side with respect to operator seat 14.

As shown in FIG. 7, cab 10 further includes an operation portion 13. Operation portion 13 is provided in front pillar 2A in cab 10. Operation portion 13 is preferably arranged above the upper surface of front console 15F. Operation portion 13 is preferably provided to protrude from front pillar 2A into cab 10.

More specifically, operation portion 13 is preferably provided to protrude from front pillar 2A toward operator seat 14. The operator can thus readily operate operation portion 13 provided in front pillar 2A in an attitude as seated on operator seat 14.

A function and effect of the present embodiment will now be described as compared to a construction of a cab 110 in a comparative example shown in FIG. 8.

Figure 8:
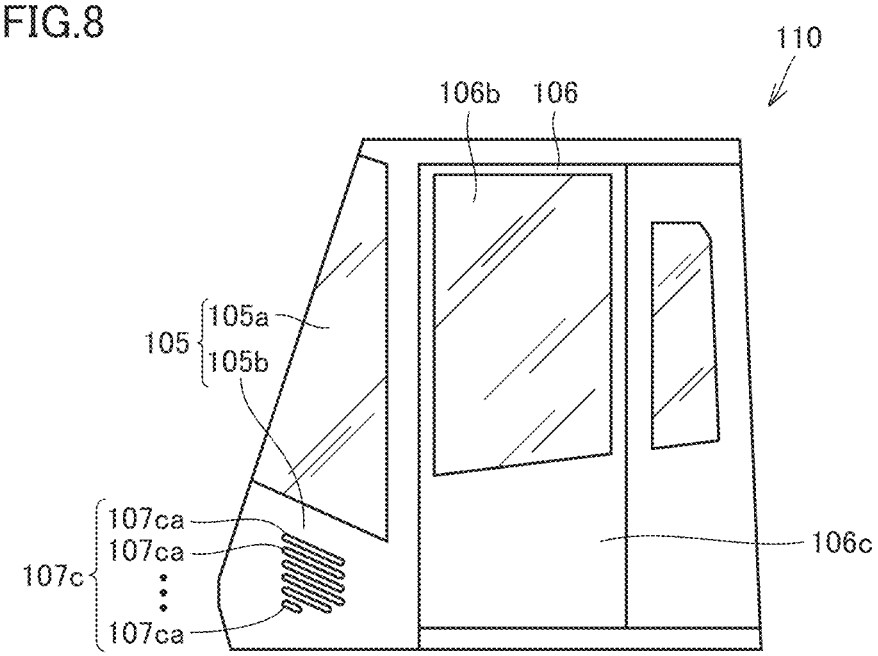
FIG. 8 is a side view showing a construction of a cab in a comparative example.

As shown in FIG. 8, in cab 110 in the comparative example, a front sidewall 105 includes a window portion 105a and an exterior panel 105b arranged under window portion 105a. Exterior panel 105b is provided with an outdoor air suction inlet 107c for supplying outdoor air to an air-conditioning unit. Outdoor air suction inlet 107c is defined by a plurality of slits 107ca. A central sidewall 106 includes a window portion 106b and an exterior panel 106c arranged under window portion 106b.

In cab 110 in such a comparative example, an operator who is seated at an operator seat is unable to have a view obliquely forward below a wheel loader due to the presence of exterior panel 105b of front sidewall 105. The operator is also unable to have a view laterally below the wheel loader due to the presence of exterior panel 106c of central sidewall 106.

In contrast, in the present embodiment, outdoor air suction inlet 7c is provided in exterior panel 7b of rear sidewall 7 as shown in FIG. 2. Therefore, in front sidewall 5, lower window 5L can be arranged under the lower end position (chain dotted line L in the figure: FIG. 2) of front console 15F. The operator who is seated at operator seat 14 in cab 10 can thus have a view obliquely forward below wheel loader 50 through lower window 5L in front sidewall 5 so that visibility is good.

In the present embodiment, a portion of central sidewall 6 below front console 15F includes transparent member 6b through which the outside can be seen from the inside of cab 10. Therefore, the operator who is seated at operator seat 14 in cab 10 can have a view laterally below wheel loader 50 through transparent member 6b in central sidewall 6 so that visibility is better.

In the present embodiment, operation portion 13 is provided in front pillar 2A as shown in FIG. 7. A part of the operation portion which should essentially be arranged in lateral console 15S in FIG. 6 is thus provided in front pillar 2A, so that the number of operation portions provided in lateral console 15S can be reduced. Lateral console 15S can thus be reduced in size. The vision of the operator who is seated at operator seat 14 is less likely to be blocked by lateral console 15S by an amount equal to reduction in size of lateral console 15S, so that the operator can view the outside of cab 10 over a wider range. Therefore, the operator's visibility is better.

In the present embodiment, as shown in FIGS. 4 and 5, at least a part of duct 11 (outdoor duct 11b) is arranged under floor panel 1. A space occupied by duct 11 in the indoor space in cab 10 can thus be decreased. A component other than duct 11 can be arranged in the indoor space in cab 10 by an amount equal to decrease in space that has been occupied by duct 11, so that the indoor space in cab 10 can effectively be used.

In the present embodiment, controller 16 is arranged directly under lateral console 15S as shown in FIG. 6. An area directly under lateral console 15S which has been a dead space can thus effectively be used. By arranging controller 16 directly under lateral console 15S, outdoor air suction inlet 7c can be provided in exterior panel 7b of rear sidewall 7. By arranging controller 16 in the area directly under lateral console 15S, block by controller 16 of the view from the operator who is seated at operator seat 14 can be suppressed.

Since controller 16 is transversely mounted, a height of controller 16 which protrudes from the upper surface of floor panel 1 can be decreased. Therefore, block by controller 16 of the view from the operator who is seated at operator seat 14 can further be suppressed.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 floor panel; 2A front pillar; 2B rear pillar; 3 roof portion; 4 front portion; 4a front window; 4b, 7b, 8b exterior panel; 5 front sidewall; 5L lower window; 5U upper window; 6 central sidewall; 6a frame; 6b transparent member; 6ba upper portion; Ebb lower portion; 7 rear sidewall; 7a window; 7c outdoor air suction inlet; 7ca slit; 8 rear portion; 8a rear window; 9 filter; 10 cab; 11 duct; 11a indoor duct; 11b outdoor duct; 12 air-conditioning unit; 13 operation portion; 14 operator seat; 14L, 14R armrest; 15F front console; 15S lateral console; 16 controller; 30 work implement; 31 boom; 32 bucket; 33 boom cylinder; 42 front frame; 43a front wheel; 43b rear wheel; 44 rear vehicular body; 44a hydraulic oil tank; 44b engine compartment; 44d counterweight; 50 wheel loader

The invention claimed is:

1. A cab for a work vehicle comprising:
    an operator seat;
    a floor panel located under the operator seat;
    an air-conditioning unit arranged in front of the operator seat;
    a rear sidewall arranged in rear of the operator seat; and
    a front wall arranged in front of the operator seat and laterally to the air-conditioning unit,
    wherein the front wall has a front portion and a front sidewall, the front sidewall includes a first window portion through which outside can be seen from inside of the cab for the work vehicle, the first window portion is located at a same height position as a height position of the air-conditioning unit, and the rear sidewall includes an outdoor air suction inlet for supplying air to the air conditioning unit via an air inlet duct,
    wherein the air inlet duct which guides air from the outdoor air suction inlet to the air-conditioning unit, and
    wherein at least a part of the air inlet duct is arranged under the floor panel and guides air from the rear sidewall arranged in rear of the operator seat to the air-conditioning unit arranged in front of the operator seat.

2. The cab for a work vehicle according to claim 1, wherein a filter is arranged between the outdoor air suction inlet of the rear sidewall and the air inlet duct.

3. The cab for a work vehicle according to claim 2, further comprising a lateral console arranged laterally to the operator seat, wherein
    the first window portion and the outdoor air suction inlet are located on a lateral side identical to a lateral side where the lateral console is arranged with respect to the operator seat.

4. The cab for a work vehicle according to claim 1, further comprising a front console arranged in front of the operator seat, wherein
    the first window portion is arranged under the front console.

5. The cab for a work vehicle according to claim 4, further comprising a central sidewall arranged laterally to the operator seat, wherein
    a part of the central sidewall located under a lower end of the front console includes a second window portion through which the outside can be seen from the inside of the cab for the work vehicle.

6. The cab for a work vehicle according to claim 5, further comprising:
    a front pillar; and
    a rear pillar located in the rear of the front pillar, wherein the central sidewall is arranged between the front pillar and the rear pillar.

7. The cab for a work vehicle according to claim 1, further comprising a front pillar, wherein
    the front sidewall extends forward from the front pillar, and
    the front sidewall includes the first window portion.

8. The cab for a work vehicle according to claim 7, further comprising an operation portion provided in the front pillar in the cab for the work vehicle.

9. The cab for a work vehicle according to claim 1, further comprising:

a lateral console arranged laterally to the operator seat; and a controller, wherein the controller is arranged directly under the lateral console.

10. A work vehicle comprising:

the cab for the work vehicle according to claim 1; and a work implement operated by an operation apparatus provided in the cab for the work vehicle.

11. The cab for a work vehicle according to claim 1, wherein the air inlet duct extends from the rear sidewall through a through hole of the floor panel to the air-conditioning unit.

* * * * *